(12) United States Patent
Atherton

(10) Patent No.: US 6,657,418 B2
(45) Date of Patent: Dec. 2, 2003

(54) PARASITIC POWER SUPPLY SYSTEM FOR SUPPLYING OPERATING POWER TO A CONTROL DEVICE

(75) Inventor: Larry S. Atherton, Ham Lake, MN (US)

(73) Assignee: Honeywell International Inc., Morristown, NJ (US)

( * ) Notice: Subject to any disclaimer, the term of this patent is extended or adjusted under 35 U.S.C. 154(b) by 169 days.

(21) Appl. No.: 10/010,824

(22) Filed: Nov. 13, 2001

(65) Prior Publication Data

US 2003/0090243 A1 May 15, 2003

(51) Int. Cl.[7] .................................................. G05F 1/40
(52) U.S. Cl. .......................... 323/282; 307/39; 323/237
(58) Field of Search ..................... 307/38, 39; 323/237, 323/239, 271, 282, 284

(56) References Cited

U.S. PATENT DOCUMENTS 5,736,795 A  *  4/1998  Zuehlke et al. ............. 307/130
5,811,963 A  *  9/1998  Elwell .......................... 323/318
5,903,139 A     5/1999  Kompelien ................... 323/282
6,356,038 B2 *  3/2002  Bishel .......................... 315/291

* cited by examiner

Primary Examiner—Michael Sherry
Assistant Examiner—Gary L. Laxton
(74) Attorney, Agent, or Firm—Kris T. Fredrick

(57) ABSTRACT

A system and method to parasitically take electrical power from a source of ac load power to provide a voltage source to directly power an associated control device is described. The system utilizes a controllable transconductance device to both selectively provide power to a controlled load and to develop a predetermined voltage to directly power the control device in a system where the ac load power is applied at one terminal and is passed through the transconductance device to be returned through the load. The system includes a means for establishing the predetermined voltage level to power the control device and for continuously monitoring that voltage level to maintain it as required, whether power is applied to the load or not. Alternative voltage regulators to provide isolated or non-isolated power to the control device irrespective of whether or not power is applied to the load are also described.

25 Claims, 5 Drawing Sheets

PARASITIC POWER SUPPLY SYSTEM FOR SUPPLYING OPERATING POWER TO A CONTROL DEVICE

BACKGROUND OF THE INVENTION

1. Field of the Invention

This invention relates generally to an improved system for providing power to a control device used to control application of electrical power to a load; and, more particularly, it relates to a parasitic control device powered by the electrical power to be applied to a load and arranged to provide regulated electrical power to a control device whether the load is actively powered or not.

2. Description of the Prior Art

Simple control systems for controlling application of electrical power to load devices are known. For example, environmental control systems such as heating, cooling, ventilating, humidifying, and air conditioning devices are known to be subject to activation and deactivation control by thermostats, timers, humidistats, and the like. In heating, cooling and air conditioning devices, simple bi-metal thermostatic switches have been utilized to directly control the application of electrical power to the device, and require no external power to the device and no external or auxiliary electrical power source to switch the load power.

Developments in electronics have resulted in the replacement of the bi-metal thermostatic switches and other control devices with electronic control devices to achieve expanded operational controls and to enhance performance. Such electronic control devices require power to operate, and typically require either battery power or an additional power circuit. It has been common to utilize an external transformer to provide this additional power, thereby adding to the component cost and necessitating installation of an additional power circuit.

It is known to utilize sensor and/or control devices to selectively control the application of electrical power to load devices in response to various sensed or controlled conditions. By way of example, thermostats are used to sense ambient temperatures of target atmospheres and function to turn on power to controlled furnaces when the sensed ambient temperatures are reduced below preset thresholds. Systems are also known to utilize timers to maintain heating or cooling cycles operational for predetermined timed cycles. In addition, such systems can include separate plenum temperature sensors to control the operation of associated blower fans to hold off activation until plenum temperatures are raised to predetermined levels. Such operation saves power until the systems are operative to move warmed air and minimizes movement of cool air and avoids feelings of cold drafts. Such plenum sensors are also often used to maintain power to blower fans after controlled furnaces have been shut off to thereby efficiently capture and make use of residual plenum heat.

It is also known to utilize sensor and/or control devices to selectively control application of electrical power to many other types of loads. Examples include utilizing control devices to selectively control application of electrical power to refrigeration equipment in response to sensed ambient temperatures or other controlled parameters; to lighting equipment in response to timers or sensed levels of light; to fan equipment in response to timed or sensed ambient temperatures; to humidity control apparatus to add or reduce humidity in response to sensed ambient humidity conditions; to timer controls to selectively activate various loads; and to valve systems in response to sensed or controlled conditions, to name a few.

Prior art systems of the type summarized characteristically utilize a separate sources of power for the sensors or control devices than that provided to power the controlled loads. In most arrangements, separate power sources, applied over separate wiring, are required. Often the separate power sources are required to be regulated, and are often at different voltage levels from that of the power source for the affected loads. As indicated, separate wiring installations for providing power to the sensors or control devices are required, such installations being separate from the electrical wiring utilized for providing power to the loads. In those installations where only load power electrical wiring is available, these requirements for separate wiring are unduly difficult and costly to provide. Prior art systems often require dc power, whereas many loads require ac power; and, as indicated, regulation of the dc power may be required; or alternatively, batteries may be required to provide power to the sensors or control devices.

A low voltage solution to some of the deficiencies in other prior art systems was provided in U.S. Pat. No. 5,903,139 (hereinafter '139), entitled Power Stealing Solid State Switch For Supplying Operating Power To An Electronic Control Device, assigned to the assignee of this invention. This prior art system recognized the advantages of eliminating the need for utilizing separate transformers, wiring, or batteries to power electronic control devices. It also recognized the desirability of utilizing power Field Effect Transistors (FETs) in a circuit that "steals" power from the load circuit during low power phase switching to provide the necessary power for the control device. To accomplish this advantageous capability, one or more timer circuits and associated switching logic circuit were utilized to control the timing of disabling the back-to-back power FETs to allow power stealing from the load circuit to maintain the low voltage power source for the control device and a higher voltage supply for controlling the gates of the FETs. These relatively complex circuits allow controlling various low levels of load voltages, for example up to about 24 volts ac or dc.

Another prior art power "stealing" circuit utilized a power transformer with a primary current winding to provide power to a control device when power is applied to the load, and a primary voltage winding to provide power to the control device when the load is not powered. This type of configuration has limited utility because it places severe limitations on the range of load currents that can be handled, and characteristically the power transformer can be quite large in size.

It is apparent, then, that prior art systems that require separate wiring installations for sensor or control systems that are used to control application of power to loads are unduly costly and/or difficult to install. Prior art systems require separate dc power sources to power the sensor or control circuits. Alternatively, battery supplies must be provided. These requirements cannot readily be satisfied in an installation where power to drive a load is only available on a single line with the power circuit to be terminated through the load.

SUMMARY OF THE INVENTION

To overcome the problems of the prior art, an improved parasitic control system and method has been developed that includes a means or method process for parasitically diverting enough power from a source of load power to provide power to a control device that is utilized to control switching of the load power to the load when a sensed or control condition is determined to exist. The power that is diverted is insufficient to negatively impact the power supplied to the load and is operative whether the power is being applied to the load or not. The parasitic diversion is accomplished through operation of a bias means or method process that controls the operation of a transconductance means that carries the load power. The bias means includes a capacitor that is charged continuously through interaction of the bias means and the transconductance means. The capacitor provides the source of voltage utilized by voltage regulator means to develop the regulated dc voltage that is supplied to provide power to the control device. In varying usages the voltage regulator can be directly powered to provide a non-isolated output voltage, or can be indirectly powered to provide an isolated output voltage.

The improved parasitic control system and method for parasitically developing a regulated dc voltage to power an associated control device directly from the ac load power source eliminates the need to provide a separate power source for the control device and minimizes the need for a separate wiring system to supply power to the control device.

One feature of the invention provides a solid state switching circuit for controlling the application of power supply voltage from a power line to a load in response to control signals received from a control device, for example a thermostat, a timer, or various other control devices, including circuitry for parasitically diverting power from the load power that is to be switched. A pair of power FETs are coupled back-to-back in series with one power terminal and have a voltage limiting device coupled across the drains to allow utilization with a relatively high voltage power source. Bias circuitry is coupled to the common gate circuits to control the switching of the power FETs to a low impedance ON state to permit current flow to the load when load powering is activated by a control device, or a high impedance OFF state during which current is substantially blocked from the load. The bias circuitry also permits the parasitic application of power from the load power source to maintain power for the control device. It is necessary to provide power to a control device power source when it is determined that the control device power source has decreased below a predetermined level, and is operative whether or not power to the load is activated. The parasitic use of load power to maintain the control device power source at a predetermined level is insufficient to negatively affect the load power or affect operation of the load. These functions are achieved for a broad range of load voltage and current requirements without the necessity of complex timer circuits and their attendant logic circuits to control the timing Another feature of the invention is to provide a regulated control device voltage from the control device power source. One embodiment provides the regulated control device voltage directly to the control device. A second embodiment provides isolation circuitry such that the regulated control device voltage applied to the control device is isolated from the switching and bias circuitry.

DETAILED DESCRIPTION OF THE PREFERRED EMBODIMENT

Figure 1:
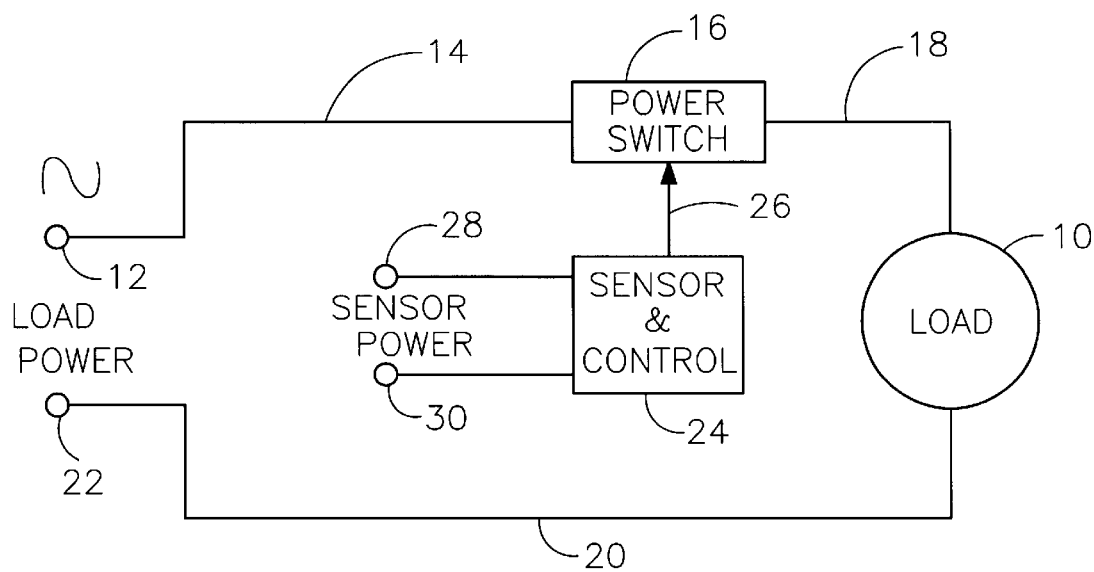
FIG. 1 is a simplified schematic block diagram of a Prior Art system that selectively provides power to a load in response to a sensed condition.

FIG. 1 is a simplified schematic block diagram of a Prior Art system that selectively provides power to a load in response to a sensed condition. In such a system a load 10 is supplied ac load power from a source (not shown) that provides ac power at terminal 12 over conductor 14 to power switch 16. The power switch 16 provides the ac power on line 18 to load 10 when the power switch 16 is activated. The power return is through load 10 via conductor 20 to terminal 22. A control device 24, which can be a sensor and/or a control circuit, is coupled by control line 26 to the power switch 16. The control device 24 receives its power from a source (not shown) that is coupled across terminals 28 and 30.

Load 10, by way of example, could be a blower in a furnace system, one or more lights, a fan in an exhaust system, a refrigeration system, valve controls, or any other type of load requiring controlled application of load power dependant upon a sensed and/or a controlled condition. It is common for power switch 16 to be a power relay that may be selectively activated by the control device 24. Control device 24 could be a thermostat in a furnace system or refrigeration system, a light sensitive control in an electric light system, a temperature and/or humidity sensor in a fan system, a timer, pressure sensitive control used with valve controls, and so on. In the prior art systems it is common for the control device 24 to be separately wired and to require a separate source of power, which may or may not be required to be regulated, thereby increasing the cost and complexity of the system.

Figure 2:
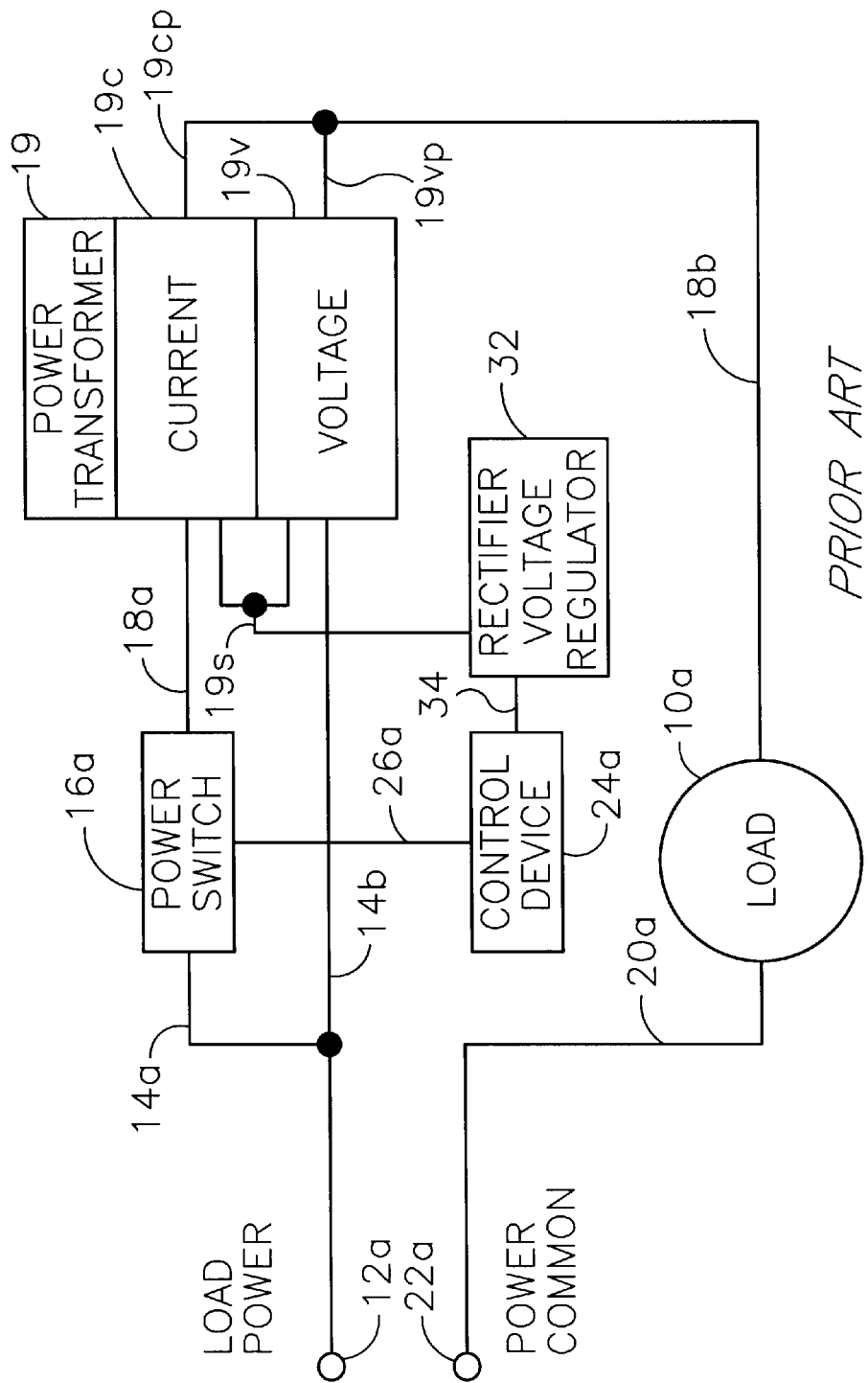
FIG. 2 is a simplified schematic block diagram of a Prior Art system that utilizes a transformer to steal power from the load power source to power a control device and to selectively provide power to a load.

FIG. 2 is a simplified schematic block diagram of a Prior Art system that utilizes a transformer to steal power from the load power source to power a control device and to selectively provide power to a load. Load power is provided at terminal 12a and is available for selective application to load 10a. The load power is applied via line 14a to power switch 16a, which again can be a relay or other suitable switching device. Power transformer 19 includes current windings 19c and voltage windings 19v. Load power is applied on line 18a to the current primary (not shown) of current transformer 19c and the other terminal 19cp of the primary current winding is coupled by line 18b to load 10a. The load power is applied on line 14b to the voltage primary winding, with the other voltage primary terminal 19vp being coupled via line 18b to load 10a. The transformer secondary winding (not shown) provides power to the control device 24a. The current winding 19c couples power to the transformer secondary winding when power switch 16a is closed and the load 10a is powered. There is little affect on the power to load 10a. When power switch 16a is opened, a small current flows through the transformer voltage winding 19v to couple power to the secondary winding. The small current has no affect on the load. In both instances, the secondary voltage at line 19s is directed to the rectifier and voltage regulator circuit 32, which in turn provides the voltage to power the control device 24a via line 34.

The Prior Art low voltage timer-controlled power stealing circuit of the '139 system need not be described or summarized further herein.

It will be shown that the system of the present invention provides substantial benefits over the operational limitations of the Prior Art described, and that it provides a system that can be utilized with a range of load power requirements, including substantially larger load power requirements than are available from other Prior Art power stealing circuits, while utilizing a less complex bias and control circuit.

Figure 3:
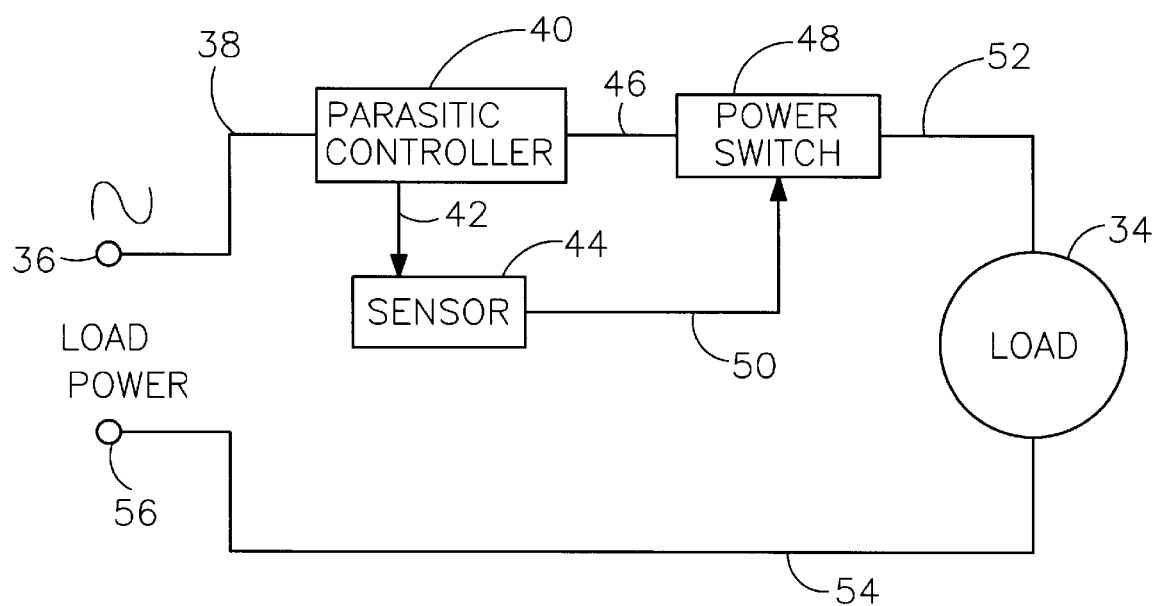
FIG. 3 is a simplified schematic block diagram of a parasitic system for selectively providing power to an associated load in accordance with sensed or controlled conditions determined by a control device that is powered by the parasitic system.

FIG. 3 is a simplified schematic block diagram of a parasitic system for selectively providing power to an associated load in accordance with sensed or controlled conditions determined by a control device that is powered by the parasitic system. A parasitic control system utilizes a minimal amount of electrical power provided to drive a load to develop electrical power for an associated control device. The system of "stealing" a small amount of load power in this parasitic manner results in elimination of the requirement of providing a separate source of power to drive the associated control device and eliminates the necessity of providing separate wiring to provide power from the separated power source.

In FIG. 3 a load 34 is supplied load power from an ac source (not shown) applied at terminal 36. This power is provided via electrical conductor 38 to parasitic controller 40, which utilizes a small portion of such power to develop supply voltage to be provided via conductor 42 to provide power to control device 44. Parasitic controller 40 also passes the load power via conductor 46 to power switch 48. Control device 44 controls the operation of power switch 48 by control signals directed over conductor 50 to the power switch. When control device 44 determines that a controlling condition has been satisfied, a control signal is provided on conductor 50 to activate power switch 48 and the load power is provided via conductor 52 to load 34, with the power return being through load 34 via conductor 54 to terminal 56. The small portion of power diverted by the parasitic controller 40 will not impair proper operation of load 34 except for low current loads of less than about 15 mA.

Figure 4:
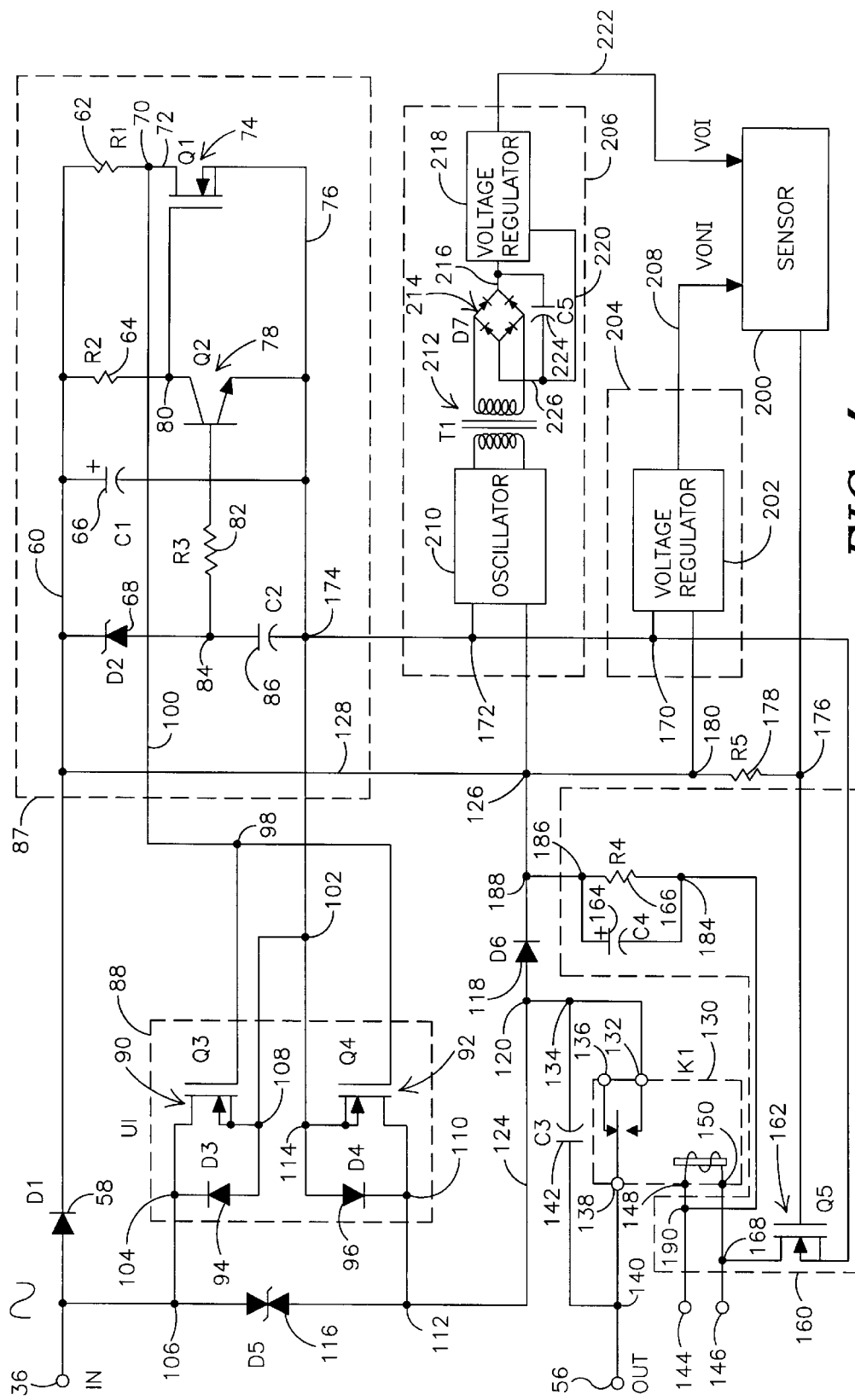
FIG. 4 is a schematic diagram of one embodiment of the parasitic system embodying the present invention with alternative circuitry to provide either isolated output voltage or non-isolated output voltage for powering an associated control device.

FIG. 4 is a schematic diagram of one embodiment of the parasitic system embodying the present invention. An alternating power source, which can be in the range of about 24 Volts to about 240 Volts is applied at terminal 36. This range of voltage is by way of example and is not intended as a limitation on the inventive concepts of the parasitic controller. A preferred embodiment for a system to control nominal ac load power of 240 volts will be described.

The input power signal is applied to diode D1 58 to pass current in the direction of the diode arrow during forward bias of the ac power signal, and such current is applied via electrical conductor 60 to resistor R1 62, resistor R2 64, capacitor C1 66, and Zener diode D2 68. Hereinafter electrical conductors will be referred to as 'lines'. R1, R2, and R3 are nominally 100 k ohms, C1 is 33 microfarads, and C2 is 0.1 microfarads for this embodiment. R1 provides a voltage drop to junction 70, which in turn is coupled via line 72 to the drain of field effect transistor (FET) Q1 74. The source of Q1 is coupled to circuit common line 76. Common line 76 is not earth ground, it being understood that with respect to earth ground, the entire circuit closely follows the voltage level of the power signal applied at terminal 36. In this regard, common line 76 will be understood to float or follow as the circuit responds to applied power. Transistor Q2 78 is an npn transistor having its collector coupled at junction 80 to the gate of Q1 and to load resistor R2, and has its emitter coupled to common line 76. The base of Q2 is coupled through resistor R3 82 to junction 84. Capacitor C1 is coupled across line 60 and common line 76. Zener diode D2 68 is coupled between line 60 and junction 84 and is selected to provide a predetermined reference voltage utilized to control the bias control for Q2. Capacitor C2 86 is coupled between junction 84 and common line 76. The circuitry within dashed box 87, whose operation will be described below, forms a bias circuit that includes a voltage source to power an associated control device.

Device U1, shown within dashed block 88, is essentially a transconductance device made up of FET Q3 90, FET Q4 92, diode D3 94, and diode D4 96. Diodes D3 and D4 are each shown as a separate device; however, in a preferred embodiment diode D3 94 is a parasitic diode that exists between the substrate and the source of FET Q3 90, and diode D4 96 is a parasitic diode that exists between the substrate and the source of FET Q4 92.

The gates of Q3 and Q4 are coupled together at junction 98 and by line 100 to junction 70, where the bias control for U1 is established. The source of Q3 and the source of Q4 are coupled together at junction 102 to common line 76. The drain of Q3 and the blocking terminal of D3 are coupled to junction 104, which in turn is coupled to junction 106. The non-blocking terminal of D3 and the drain of Q3 are coupled to junction 108. In a similar structure, the drain of Q4 and the blocking terminal of D4 are coupled to junction 110, which in turn is coupled to junction 112. The non-blocking terminal of D4 and the source of Q4 are coupled to junction 114. Opposed breakdown diode D5 116 is coupled across junctions 106 and 112 and functions to limit the voltage applied across U1 in both polarities. For the embodiment described, D5 is a limiting means that establishes nominally a limit of 15 volts. Diode D6 118 is coupled to junction 120 and via line 124 to junction 112, and to junction 126, with junction 126 being coupled to line 60 via line 128.

Diodes D1, D3, D4, and D6 function as a full-wave bridge rectifier when Q3 and Q4 are biased off. Capacitor C1 functions as a filter capacitor and as the voltage reference source to provide power to a control device. Diode D2, and transistors Q1 and Q2 function to control FETs Q3 and Q4 to maintain C1 charged to a regulated voltage level determined by Zener diode D2. This voltage is provided to either the isolated voltage regulator 206 or to the non-isolated voltage regulator 202

The control of the application of power to output terminal 56 for application to a load (not shown) is accomplished by a controlled switch, such as relay K1 shown as dashed block 130, and has a normally-open contact 132 coupled to junction 134, which in turn is coupled to junction 120. Normally-closed contact 136 is not connected. Wiper contact 138 is coupled to junction 140, which in turn is coupled to output terminal 56. Capacitor C3 142 is coupled across junctions 134 and 140 and for this embodiment has a value of 0.033 microfarads 250 volts ac. Capacitor C3 provides capacitive coupling through a load to the other side of the load power (not shown). The application of an activating signal across terminals 144 and 146 will cause activation of coil terminals 148 and 150, thereby causing wiper 138 to be switched and make contact with normally-open contact 132.

An optional control for relay K1 is shown within dashed block 160 and includes FET Q5 162, capacitor C4 164 and resistor R4 166. The drain of Q5 is coupled to junction 168 to provide drive to terminal 150 for relay K1, and has its source coupled through junctions 170 and 172 to junction 174, thereby connecting to common line 76. The gate of Q5 is coupled through junction 176 to resistor R5 178, which in turn is coupled through junctions 180 and 172 power line 60. Signals for terminal 148 are derived from the R-C network of R4 and C4, where C4 is coupled across junctions 184 and 186. Junction 186 is coupled to junction 188, and junction 184 is coupled to junction 190 to provide the signals to relay coil terminal 148.

A control device 200 for differing applications can be powered directly by voltage regulator 202 comprising a source of non-isolated voltage shown within dashed block 204, or from an isolated voltage source shown within dashed block 206. The selection of an isolated voltage source or a non-isolated voltage source will depend upon the nature of the control device used and the particular application, it being understood that either the isolated voltage source or the non-isolated voltage source, but not both, would be utilized for a particular application.

For a non-isolated application, voltage regulator 202 is provided input signals through junctions 170 and 180, and functions to provide non-isolated output voltage Vnio on line 208 to control device 200. A form of voltage regulator will be described below.

For an isolated application, isolated voltage source 206 utilizes an oscillator 210 that is coupled to junctions 126 and 172 and to the primary coil of transformer T1 212. The secondary windings of T1 are coupled across a pair of terminals for diode bridge rectifier network D7 214. A third terminal of the bridge 214 is coupled via line 216 to voltage regulator 218 and to a terminal of capacitor C5 224. The fourth terminal of D7 is coupled via line 226 to the other terminal of C5 and to the voltage regulator 218 via line 220. In the preferred embodiment C5 has a nominal value of 15 microfarads. Voltage regulator 218 provides isolated output voltage Vio to control device 200 via line 222.

Figure 5:
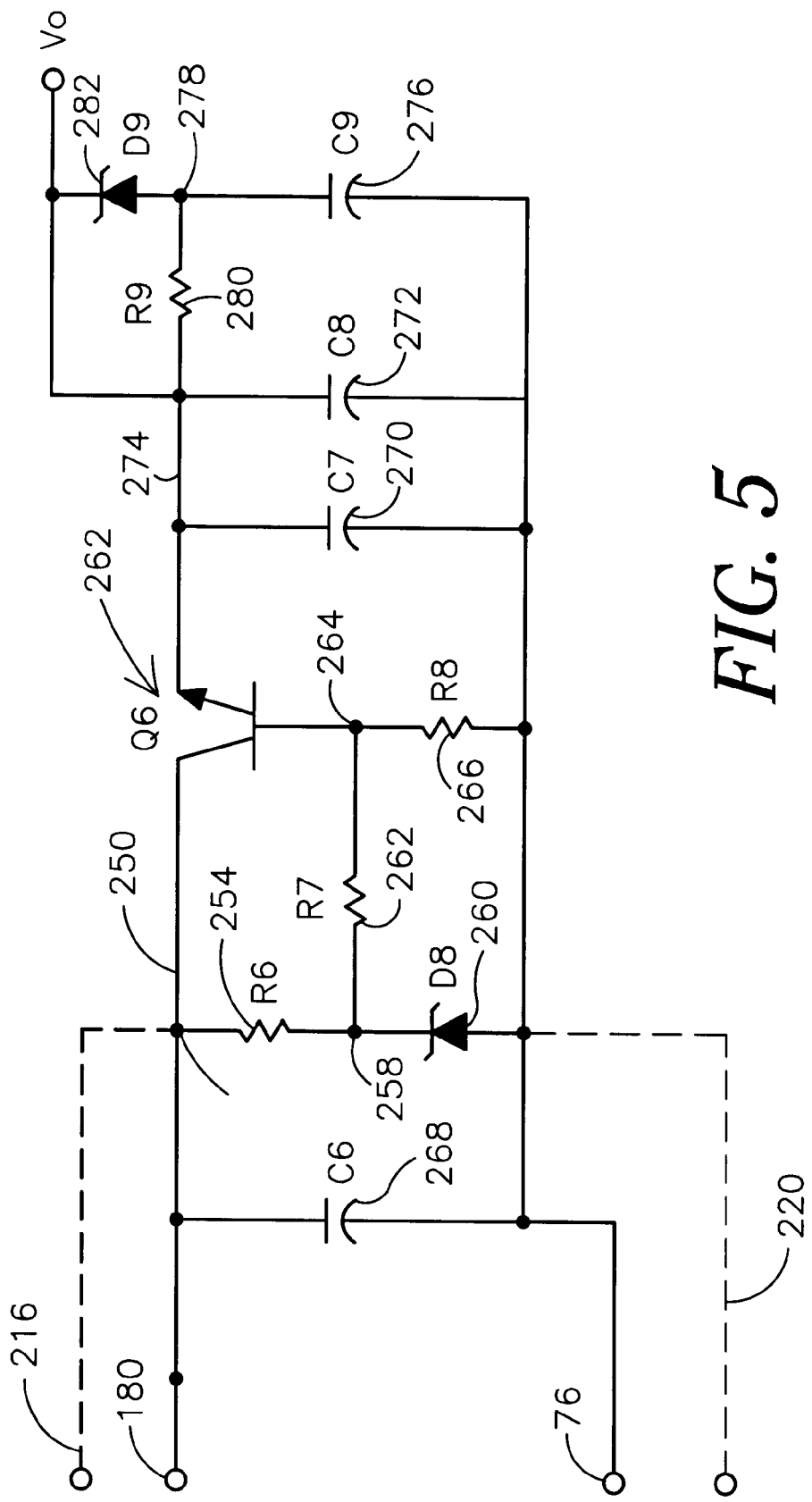
FIG. 5 is a schematic diagram of a voltage regulator.

FIG. 5 is a schematic diagram of a voltage regulator with alternative circuitry to provide either isolated output voltage or non-isolated output voltage for powering an associated control device. It will be seen that the voltage regulator circuits for the isolated and non-isolated configuration are the same, with the non-isolated configuration input shown in solid lines and the isolated configuration is shown in dashed line.

Considering the non-isolated configuration, power is received at terminal 180 and is applied on line 250 to the collector of npn transistor Q6 252. The bias for Q6 is developed by resistor R6 254, which is coupled between junctions 256 and 258; Zener diode D8 260, which is coupled between junction 258 and circuit common line 76; resistor R7 262, which is coupled between junctions 258 and 264; and resistor R8 266, which is coupled between common line 76, and through junction 264 to the base of Q6. In the preferred embodiment a nominal value for R6 is 5.1 k ohms, R7 is 3.9 k ohms, R8 is 12 k ohms, and D8 sets a reference voltage. Capacitor C6 268 is coupled across line 250 and common line 76, and is nominally 0.01 microfarads.

The dc output voltage Vo is derived from the emitter of Q6 and is established by the output network that includes, capacitors C7 270 and C8 272, both of which are coupled across line 274 and common line 76; capacitor C9 276, which is coupled between junction 278 and common line 76; resistor R9 280, which coupled is between junction 278 and output line 274; and low voltage drop schottky diode D9 282, which is coupled between junction 278 and output line 274. The regulated voltage at Q6 emitter is set by the values of D8, R7 and R8. Capacitors C7 and C8 are output filter capacitors. Resistor R9 in conjunction with diode D9 limit the charging current for Capacitor C9. This allows control device 200 to start operating if capacitor C9 is completely discharged. Capacitor C9 is a supercapacitor that can keep the control device operating for several hours during a power outage. Nominally, C7 is 15 microfarads, C8 is 0.01 microfarads, C9 is 0.33 farads, and R9 is 3.01 k.

The isolated voltage regulator configuration is identical, with the positive output from diode bridge network D7 provided on dashed line 216 to junction 256 to provide a voltage signal to Q6. Dashed line 220 provides the isolated common connection from the negative output of D7.

The foregoing description of the preferred embodiment has been directed at parasitically deriving power to drive an associated sensor where the ac load power is nominally 240 volts ac. It is of course understood that for different sources of ac power and for different types of control devices, the values and arrangement of the various components may have to be adjusted, and that such adjustments are routine and will not depart from the inventive concepts. All of the components are available commercially.

Operation

Having described the arrangement of the preferred embodiment, the following is a description of the operation of the invention.

The FET usage in this embodiment has similar operation to npn transistors, and in operation has the drain more positive than the source. No current flows from the drain to the source unless the gate is biased more positive than the source. When the gate is forward biased, drain current flows to the source. The FET has practically no gate current resulting in extremely high input impedance. It also has high incremental drain impedance, resulting in nearly constant current when the drain-source bias voltage is greater than one or two volts. The drain current can be increased or decreased by either increasing or decreasing the gate-to-source bias, respectively. The FET is essentially a transconductance device, with gate-source voltage programming the drain current. The gate of a FET is insulated from the drain-source channel, and can be quite extensively biased without incurring diode conduction to the gate. Finally, the FET operates essentially as a resistor, with the drain-source resistance programmed by the gate-source voltage. The FET has a parasitic diode between the substrate and its source. Modern metal oxide semiconductor field effect transistors (MOSFET) have been developed with high current capabilities that may handle 30 or more amperes.

To understand the operation of the described embodiment, it is necessary to understand that the source of load power (not shown in FIG. 4) is applied at input terminal 36, the load power passes through the circuitry that has been described, and when control device 200 indicates that power should be applied to a load, the power switch K1 passes the load power to the load at output terminal 56. The load power is then passed through the load to ground or common and completes the power circuit. The load power is from an ac source and causes the voltage at terminal 36 to vary accordingly. Common line 76 follows with respect to the variations of the applied ac load power.

When load power is initially applied, Q1 is turned on (conducting current), and Q2 is off (non-conducting) and FETs Q3 and Q4 are off. When line 36 is more positive than line 124, the current path is through diode D1, capacitor C1 and diode D4 to line 124. When line 124 is more positive than line 36, the current path is through diode D6, capacitor C1 and diode D3 to line 36. During the positive half-cycle of the ac load power, D1 turns on to pass current, and charges C1 to a voltage level that causes Zener diode D2 to break down and charges C2. Once C1 charges above the breakdown voltage of D2, a bias voltage is developed at junction 84 that puts a bias on the base of Q2 at a level to cause it to turn on. When Q2 is biased on, it develops a bias voltage at junction 80 that biases the gate of FET Q1 such that Q1 is off. The bias control for transconductance device U1 is developed at junction 70 and is applied to the gates of U1 transistors Q3 and Q4 at junction 98. When Q1 is off, a bias voltage is developed at junction 98 from line 100 that is of a level to turn Q3 and Q4 on. When Q3 and Q4 are biased on, a low impedance path is developed between terminal 36 and line 124. The charge to capacitor C1 is held through diodes D1 and D6 when Q3 and Q4 are on. The charging cycle is repeated as necessary to maintain C1 charged to the level determined by Zener diode D2. Thus, when control device 200 determines that load power is to be delivered to the load and the control terminals 148 and 150 are activated to cause relay K1 to close and put wiper contact 138 in contact with terminal 132, there is a direct connection between input terminal 36 and output terminal 56 to the load when Q3 and Q4 are biased on. On the positive half-cycle the power path from input terminal 36 is through Q3 to common line 76 through Q4, and then to normally-open terminal 132 (now closed) of K1 where it passes to wiper contact 138, and thence to the load via output terminal 56.

When the ac power signal goes low during the other half-cycle, current passes from terminal 56 through the relay contacts K1 to line 120, through Q4 to common line 76, and through D3 to terminal 36.

When the voltage across C1 drops below the breakdown voltage of D2, Q2 is biased to turn off, which in turn biases the gate of Q1 in such a manner that Q1 is turned on. This causes Q3 and Q4 to be briefly biased off and C1 is recharged to the breakdown voltage of diode D2 in a manner similar to that described above. When U1 FETs Q3 and Q4 are off, C1 charges through diodes D1 and D6 and diodes D3 and D4 of U1, in the manner described above.

In normal operation, then, Q3 and Q4 are normally biased to be conducting, but are briefly biased off to charge C1. This interruption of the direct power connection between input 36 and output 56 is very brief and is insufficient to negatively affect the supply of power to the load.

The foregoing description of operation has been made for the situation where K1 has been activated by the control device and the normally-open contact has been closed. The basic operation of maintaining C1 charged to a predetermined level is essentially the same whether power switch K1 is activated or not. For those situations of operation where K1 is not activated, C3 provides capacitive coupling of the circuit to termination through the load. When the power switch K1 is open, the path from line 124 to terminal 56 is through C3. The operation to charge C1 is similar to that described above, but in this circumstance C3 provides the capacitive coupling to the load power to complete the circuit rather than passing through the closed contact of K1 when K1 is activated. Due to this coupling when K1 is not activated, the time to charge C1 will be somewhat longer than when charging takes place when K1 is activated. It will also result in Q3 and Q4 being biased off for a somewhat longer period of time, but this too is insufficient to negatively impact the supply of power to the load. Capacitor C3 is selected for current requirements of the control device and to limit current through the load to a level that the load remains off.

As noted above bi-directional breakdown diode D5 is utilized to control to the maximum voltage drop across U1 and the charging circuit. It also limits the allowable swing of voltages on common line 76.

The voltage charge on C1 is utilized to develop the output of the circuit that is provided as the input to either oscillator 210 or to voltage regulator 202. As noted above, both voltage regulator 202 and oscillator 210 are each coupled to common line 76. It is also noted that one or the other of the isolated or non-isolated sources would be used for any particular control device 200 utilized to control activation of the operation of K1 to supply or not supply power to a load.

The operation of the isolated supply involves the circuit elements shown in dashed block 206, and utilizes the voltage levels provided at juncture 172 to drive the oscillator with respect to the level established by common line 76. Oscillators of this type are known in the art, and function to provide an oscillating signal to the primary of transformer T1. This signal is passed to the secondary of T1, thereby providing the isolation, and is rectified by fall wave rectifier diode bridge D7. The signal provided on line 216 is directed to the voltage regulator 218.

For the non-isolated configuration, the voltage input is provided directly from C1 at juncture 180. Voltage regulator 202 is also coupled to common line 76, as shown in FIG. 5.

The operation of the voltage regulator is such that the non-isolated voltage applied at junctures 180 and 76 is provided by C1, and the isolated voltage applied at junctures 216 and 228 is provided by C5. This voltage in is applied at juncture 256 to capacitor C6, the collector of Q6, and to the bias network made up of D7 and resistors R7 and R8, that controls the base bias of Q6. The bias network will cause Q6 to conduct under control of the input voltage, but limited by the breakdown voltage of Zener diode D8 which will limit the swing of the base bias. The output of Q6 is applied to filter capacitors C7 and C8. Resistor R9 in conjunction with diode D9, limit the charging current for capacitor C9. Capacitor C9 is a super capacitor that can keep the control device operating for several hours in the event of load power outage. In a characteristic embodiment Vo will be in the order of 3 volts dc, but can be adjusted to meet the needs of providing power to any particular control device.

As shown in FIG. 4, the control of activation of K1 is via a relay control circuit shown in dashed block 160. In operation control device 200 provides an activation signal to juncture 176, which in turn is applied to the gate of Q5. The source of Q5 is coupled to common line 76, and the drain is coupled to coil terminal 168. The R-C network of R4 and C4 is coupled to the other terminal 190 to be coupled to the activation coil of K1. In operation Q5 is turned on when its gate is forward biased by the activation signal provided by the control device, thereby completing the circuit to provide activation power to the coil. It is of course understood that the control device could be utilized to activate relay coil terminals 148 and 150 directly to control operation of relay K1.

The invention has been fully described in conjunction with the Drawings, and has been described in its presently contemplated best mode. It is clear that it is susceptible to various modifications, modes of operation and embodiments, all within the ability and skill of those skilled in the art, without further invention. Accordingly, what is intended to be protected by Letters Patent is set forth in the appended claims.

What is claimed is:

1. For use in controlling selective application of electrical load power to a load, a parasitic control system to provide power to a control device from the load power comprising:

first means for coupling to a source of electrical load power to be selectively applied to a load;

second means for parasitically diverting a predetermined amount of power from applied electrical load power whether or not said load power is applied to the load, said predetermined amount of power being insufficient to impair proper operation of a the load when power is applied to the load or to cause activation of the load when load power is not applied to the load;

third means coupled to said second means for providing control device power at a predetermined voltage level to a control device; and fourth means for sensing said predetermined voltage level of said control device power provided by said third means and for activating said second means as necessary to maintain said predetermined voltage level.

2. A parasitic control system as in claim 1, wherein said third means further includes:

fifth means for regulating a predetermined dc voltage level to power a control device.

3. A parasitic control system as in claim 2, and further including:

sixth means for isolating and regulating a predetermined isolated dc voltage level to be provided to a control device.

4. A parasitic control system as in claim 1, and further including power activating means for activating application of applied electrical load power to a load in response to an activation signal provided by a control device powered by said predetermined control device power.

5. A parasitic control system as in claim 1, and further including limiting means for limiting the voltage drop across said second means.

6. For use in providing ac electrical power to a load, a parasitic power controller comprising:

a power input terminal to couple to a source of alternating load power;

a transconductance circuit having a first terminal coupled to said power input terminal, a second terminal, and at least one control terminal to receive control signals to switch said transconductance circuit off or on;

a power circuit to provide a predetermined voltage to power a control device;

a bias switching circuit coupled to said power input terminal, to said power circuit, and to said at least one control terminal to cause said transconductance circuit to be switched to a predetermined state and to cause said power circuit to maintain said predetermined voltage level; and an output circuit coupled to said transconductance circuit and to said power circuit and having a voltage output terminal to provide a predetermined output voltage;

whereby said predetermined voltage level is maintained whether the load power is applied to a load or not.

7. A parasitic power controller as in claim 6, and further including a power switching circuit having an activation circuit to couple to a control device, a power-in terminal coupled to said second terminal of said transconductance circuit, and a power-out terminal to couple to a load to selectively provide power to the load under control of the control device, whereby said output voltage is supplied to the control device and said transconductance circuit passes electrical load power through said power switching circuit to the load when the control device provides an activating signal to said activation circuit.

8. A parasitic power controller as in claim 6, wherein said transconductance device includes:

first and second field-effect transistors, each having a source, a drain, and a gate, and each of said gates coupled to said at least one control terminal;

a first diode coupled across said source and said drain of said first field-effect transistor; and a second diode coupled across said source and said drain of said second field-effect transistor.

9. A parasitic power controller as in claim 8, and further including a voltage drop limiting circuit coupled across said first terminal and said second terminal, including a pair of oppositely coupled voltage breakdown circuits to limit voltage drop across said transconductance circuit.

10. A parasitic power controller as in claim 8, wherein said bias switching circuit includes:

a first line diode having a first terminal coupled to said power input terminal and a second terminal coupled to a first line;

a second line diode coupled to said second terminal and said first line;

a common line coupled to said drain of said first field-effect transistor and to said drain of said second field-effect transistor;

a third field-effect transistor having a source coupled to said first line through a first juncture, a drain coupled to said common line, and a gate coupled through a second juncture to said at least one control terminal of said transconductance circuit;

a transistor having a collector coupled to said first line and to said second juncture, an emitter coupled to said common line, and a base coupled to a third juncture;

a first capacitor coupled between said first line and said common line;

a breakdown diode having a terminal coupled to said first line and a second terminal coupled to said third juncture to provide a reference voltage; and a second capacitor coupled between said third juncture and said common line.

11. A parasitic power controller as in claim 6, wherein said power switching circuit comprises:

a relay having a normally open contact coupled to said second terminal of said transconductance circuit, a normally closed terminal, a contact coupled to said power-out terminal, and said activation circuit; and a capacitor coupled between said normally open contact and said contact coupled to said power-out terminal.

12. A parasitic power controller as in claim 6, and further including:

a voltage regulator having a first input terminal coupled to said common line, a second input terminal coupled to a common point, and an output terminal for providing predetermined non-isolated regulated dc voltage to a control sensor; and a diode coupled between said common point and said second terminal of said transconductance circuit.

13. A parasitic power controller as in claim 6, and further including:

an oscillator having a first input coupled to said common line and a second input coupled to a common point, and having output terminals;

a transform having a primary winding coupled to said output terminals of said oscillator, and having a secondary winding;

a bridge circuit coupled across said secondary winding, and having first and second bridge output terminals; and a voltage regulator coupled to said first and second bridge output terminals and having an output terminal for providing a predetermined isolated regulated dc voltage to a control sensor.

14. A parasitic power controller as in claim 6, and further including an isolating activation control circuit comprising:

an isolation field-effect transistor having a drain coupled to said activation circuit of said power switching circuit, a source coupled to said bias switching circuit, and a gate coupled to said second terminal of said transconductance circuit, said gate arranged to receive the activating signal from the control sensor.

15. In a system for controlling selective application of electrical load power to a load under control of a control system, the method of parasitically providing power for the control system comprising:

coupling to a source of electrical load power;

parasitically diverting a predetermined amount of electrical power from the electrical load power, whether or not said load power is applied to the load, to form a power source to be utilized to power the control system;

sensing the level of said power source;

selectively maintaining said power source at a predetermined level;

developing a dc output voltage from said predetermined amount of electrical power;

providing said dc output voltage to the control system; and selectively activating application of the electrical load power to the load in response to the sensed conditions developed by the control system.

16. The method of claim 15, and further including the step of:

regulating said dc output voltage prior to said step of providing said dc output voltage to the control system.

17. The method of claim 16, wherein said developing step includes:

isolating said step of developing said dc output voltage from said step of providing said dc output voltage to the control system.

18. The method of claim 15, wherein the step of parasitically diverting a predetermined amount of electrical power includes:

applying the electrical load power to a transconductance device and to a bias circuit that controls the transconductance device;

causing the bias circuit to control the transconductance device to conduct sufficient power in response to the applied electrical load power whether or not the electrical load power is applied to the load, to thereby allow said dc output voltage to be developed; and passing the electrical load power through the transconductance device to the load when control system determines the load should have power applied.

19. The method of claim 18, and further including the step of:

regulating said dc output voltage to a predetermined voltage level prior to said step of providing said dc output voltage to the control system.

20. For use in selectively providing ac electrical power to a load, a control circuit comprising:

a power input terminal to couple to a source of ac electrical power;

a transconductance circuit having a first terminal coupled to said power input terminal, a second terminal, and at least one control terminal to receive control signals to control the level of current flow through said transconductance circuit;

a voltage drop limiting circuit coupled across said first terminal and said second terminal;

a bias switching circuit coupled to said power input terminal and said at least one control terminal, bias switching circuit including a control device power source;

a dc output circuit coupled to said transconductance circuit and to said bias switching circuit and having a dc voltage output terminal to provide a predetermined dc voltage determined by said control device power source;

a control device having a dc power terminal coupled to said dc voltage output terminal, a sensing device to determine when electrical power should be applied to a load, and a control output terminal to provide activation signals;

a power switching circuit having an activation circuit coupled to said control output terminal, said power switching circuit having a power-in terminal coupled to said second terminal of said transconductance circuit, and a power-out terminal to couple to a load to selectively provide power to the load under control of said activation signals;

whereby sufficient power is parasitically withdrawn as needed from the ac electrical power available to power the load to be converted to said predetermined dc output voltage necessary to provide the power needed to operate said control device and, wherein said sufficient power is parasitically withdrawn whether or not electrical power is applied to the load by the power switching circuit.

21. A control circuit as in claim 20, wherein said control device includes:

a sensor device to sense a predetermined ambient condition to determine the need of activating the application of electrical power to a load.

22. A control circuit as in claim 20, wherein said dc output circuit includes:

a voltage regulator circuit to provide said predetermined dc output voltage at a predetermined regulated level to be applied to said dc voltage output terminal.

23. A control circuit as in claim 22, and further including:

an isolation circuit coupled intermediate said voltage regulator circuit and said power input terminal to isolate said sensor control device from the source of ac electrical power.

24. A control circuit as in claim 20, wherein said bias switching circuit includes:

a floating common conductor; and said control device power source includes a first capacitor coupled between said power input terminal and said floating common conductor, wherein said first capacitor is kept charged to a predetermined level by operation of said transconductance circuit.

25. A control circuit as in claim 24, and further including:

a second capacitor coupled to said second terminal of said transconductance circuit and to said power-out terminal of said power switching circuit to provide coupling to said power-out terminal when said power switching circuit is deactivated.

* * * * *